United States Patent [19]

Butenop

[11] Patent Number: 5,348,248
[45] Date of Patent: Sep. 20, 1994

[54] SAFETY BELT REELING DEVICE WITH LOCKING DEVICE DEACTIVATION IN RESPONSE TO COIL DIAMETER

[75] Inventor: Klaus Butenop, Herzhorn, Fed. Rep. of Germany

[73] Assignee: Autoflug GmbH & Co. Fahrzeugtechnik, Rellingen, Fed. Rep. of Germany

[21] Appl. No.: 773,890

[22] PCT Filed: Apr. 11, 1990

[86] PCT No.: PCT/DE90/00283

§ 371 Date: Oct. 25, 1991

§ 102(e) Date: Oct. 25, 1991

[87] PCT Pub. No.: WO90/12709

PCT Pub. Date: Nov. 1, 1990

[30] Foreign Application Priority Data

Apr. 25, 1989 [DE] Fed. Rep. of Germany ....... 3913631

[51] Int. Cl.⁵ .................. B60R 22/38; B60R 22/40
[52] U.S. Cl. ................. 242/383.2; 242/384.6; 242/383.1
[58] Field of Search ........... 242/107.4, 104.4 A, 242/107.4 B; 280/806; 297/478, 480

[56] References Cited

U.S. PATENT DOCUMENTS

| | | | |
|---|---|---|---|
| 3,862,726 | 1/1975 | Ulrich et al. | 242/107.4 |
| 3,901,459 | 8/1975 | Romanzi et al. | 242/107.4 |
| 4,537,363 | 8/1985 | Thomas | 242/107.4 |
| 4,566,649 | 1/1986 | Peterson, III | 242/107.4 |
| 4,767,082 | 8/1988 | Schmidt et al. | 242/107.4 |
| 5,037,038 | 8/1991 | Zygutis et al. | 242/107.4 |

FOREIGN PATENT DOCUMENTS 3441532 5/1986 Fed. Rep. of Germany .......... B60R 22/36

Primary Examiner—John M. Jillions
Attorney, Agent, or Firm—Robert W. Becker & Associates

[57] ABSTRACT

A self-locking safety belt reeling device for a safety belt system of motor vehicles, comprising a casing and a reeling shaft having at one end an eccentric locking member, is provided. The locking member, depending on a radial deflection resulting from a safety belt-sensitive and vehicle-sensitive locking system, contacts abutments fastened to the casing and locks the reeling shaft. The locking member is coupled with a control disk having first outer toothing and which is lockable by the vehicle-sensitive locking system embodied as a spherical sensor having a sensor lever. The safety belt-sensitive locking system is embodied as a pivotable spring-loaded inertia mass that cooperates with the locking member. The locking member is pivotable into engagement with an inner toothing provided at a bearing cup connected to the casing. The inner toothing is connected to a second outer toothing. The inner toothing and the second outer toothing are mounted on a member which is freely rotatable relative to the bearing cup and which is lockable by an outwardly arranged lever engaging the second outer toothing for rendering the locking systems operational or non-operational. The outwardly arranged lever of the safety belt reeling device has a first arm for engaging the second outer toothing and a second arm for sensing a thickness of the wound safety belt coil. The outwardly arranged lever is pivotably supported at the casing and is forced into engagement with the second outer toothing by a spring.

2 Claims, 3 Drawing Sheets

SAFETY BELT REELING DEVICE WITH LOCKING DEVICE DEACTIVATION IN RESPONSE TO COIL DIAMETER

BACKGROUND OF THE INVENTION

The invention relates to a self-locking safety belt reeling device for a safety belt system in motor vehicles comprising a casing and a safety belt reeling shaft supported therein with a locking member being supported eccentrically at one end of said safety belt reeling shaft, which, depending on a radial deflection controlled by a safety belt- and/or vehicle-sensitive locking system, contacts abutments fastened at said casing and locks the safety belt reeling shaft, for which purpose the locking member is coupled to an external toothing of a control disc which on the one hand is lockable by a vehicle-sensitive system in the form of a spherical sensor and is provided, on the other hand, with the safety belt sensitive system in the form of a pivotable spring-loaded inertia mass that cooperates with a control lever, whereby the control lever is pivotable into engagement with an inner toothing provided at a bearing cup that is fixedly connected to the casing, the inner toothing corresponding to an outer toothing whereby the inner and outer toothings are freely rotatable in relation to the bearing cup and are lockable by a lever which is outwardly arranged relative to the inner and outer toothings and serves as a control means for activating and deactivating the safety belt-sensitive and the vehicle-sensitive locking system at the control disc.

A safety belt reeling device of this type is described in DE-OS 34 41 532; in the known safety belt reeling device the control means for the activation or deactivation of the safety belt-sensitive and the vehicle-sensitive locking system is provided in the form of an electromagnet which, when excited, brings the lever, cooperating with the outer toothing that is freely rotatable in the bearing cup which is fixedly connected to the casing, into its engaging position with the outer toothing with the aid of a plunger, whereby the outer toothing becomes fixed in relation to the bearing cup due to the corresponding inner toothing, so that the inertia control system cooperating with the control disc of the safety belt reeling device is provided with a functional abutment. If the lever is out of engagement with the outer toothing that is pivotable in the bearing cup, the safety belt-sensitive as well as the vehicle-sensitive locking systems are both deactivated because in that case no functional abutment exists for the cooperation between the control disc and the inertia control system; in that position the plunger pushes simultaneously the sensor lever, that is operating with the outer toothing of the control disc of the spherical sensor, out of engagement with the control disc.

The known apparatus involves the disadvantage that the control of the activation and deactivation of the respective locking system via an electromagnet is expensive, because in addition to the translatory mechanism a special sensor control is required and must be provided for. This also involves weaknesses of the known apparatus, because in the event of either the magnet or the sensor becoming inoperative or in the event of faulty signal transmission, the function of the safety belt reeling device in respect of self-locking under operational conditions of the motor vehicle is no longer ensured if the lever is permanently out of engagement with the outer toothing.

A safety belt reeling device has been known from U.S. Pat. No. 3,862,726 in which a spring arm of a spring that loads a locking member into a locking position with an outer toothing of a respective safety belt reeling shaft rests at the safety belt coil and senses the thickness of the safety belt coil wound onto the safety belt reeling shaft. In order to avoid the resulting locking of the safety belt reeling shaft by the locking member when the safety belt is completely removed from the reeling shaft and the spring arm is completely pivoted towards the reeling shaft, additional control devices are required.

It is therefore an object of the invention to improve a safety belt reeling device having the characteristics of the aforementioned type, such that the control of the activation and deactivation of the safety belt-sensitive and the vehicle-sensitive locking system is simplified and the operational reliability of a so designed safety belt reeling device is improved.

SUMMARY OF THE INVENTION

The present invention provides that the lever which effects the activation and deactivation comprises an arm for engaging the outer toothing provided at the bearing cup and a further arm for sensing the safety belt coil wound onto the safety belt reeling shaft and is pivotally mounted on the safety belt reeling device casing, spring biased towards its engaging position with the outer toothing.

This involves the advantage that any special reception of a control signal and its translation is dispensed with. The thickness of the safety belt coil which is present on the safety belt reeling shaft and is therefore detectable, serves in a simple manner as the controlling factor for activation and deactivation. More particularly, if the safety belt has been fully wound onto the safety belt reeling shaft, so that the safety belt coil has its maximum thickness, the safety belt is necessarily in its unfastened condition so that in that case the deactivation of the safety belt-sensitive and vehicle-sensitive locking system is achieved for the then solely applicable procedure of applying the safety belt. For that purpose the corresponding lever for locking the outer toothing is advantageously provided with two arms one arm of which adopts the feeler function for sensing the safety belt coil. A change in thickness of the safety belt coil, due to the preset springloading of the lever towards its engaging position, leads therefore automatically to a pivoting of the lever into its engagement position or its release position, depending on the prevailing thickness of the safety belt coil.

A further advantage of the invention results from the fact that the safety belt reeling device may easily be retrofitted with an appropriately designed vehicle-sensitive and safety belt-sensitive locking system, because it was found that the deactivation of the locking functions is desirable even in the case of three point safety belts which are not employed in the context of passive safety belt systems. Even in the case of conventional three point safety belts, a ratchet engagement of the force-absorbing locking elements should be prevented when the safety belt is in the released position in order to avoid jamming of the components of the safety belt reeling device when the safety belt is being fastened. Particularly in conjunction with the level adjustments of the upper deflection fitting, nowadays gaining in popularity, such jamming of the safety belt when being fastened can be disadvantageous, and in the case of an automatic safety belt level adjustment in conjunction with a seat adjustment mechanism the level adjustment means may be overloaded and damaged. The aforementioned problems are advantageously avoidable by the features of the invention which may be provided in a simple manner.

In a preferred embodiment of the invention the reliability of the means for activating and deactivating may be increased in that the lever at its end that is opposite the engagement tip and projects beyond its pivoting axis, is provided with a weight which biases the lever towards its engagement position. Even if the torsion spring, biasing the lever into its position of engagement, should become inoperative or faulty, the weight will automatically hold the lever in its engaged position so that in any event the inertia control system finds a functional counter abutment in the outer toothing with the corresponding inner toothing, the outer toothing being held in position by the lever, so that the overall functional reliability of the safety belt reeling device is ensured.

BRIEF DESCRIPTION OF THE DRAWINGS

In the drawing an embodiment of the invention is illustrated which will be described in the following. There is shown in.

DESCRIPTION OF THE PREFERRED EMBODIMENTS

Figure 1:
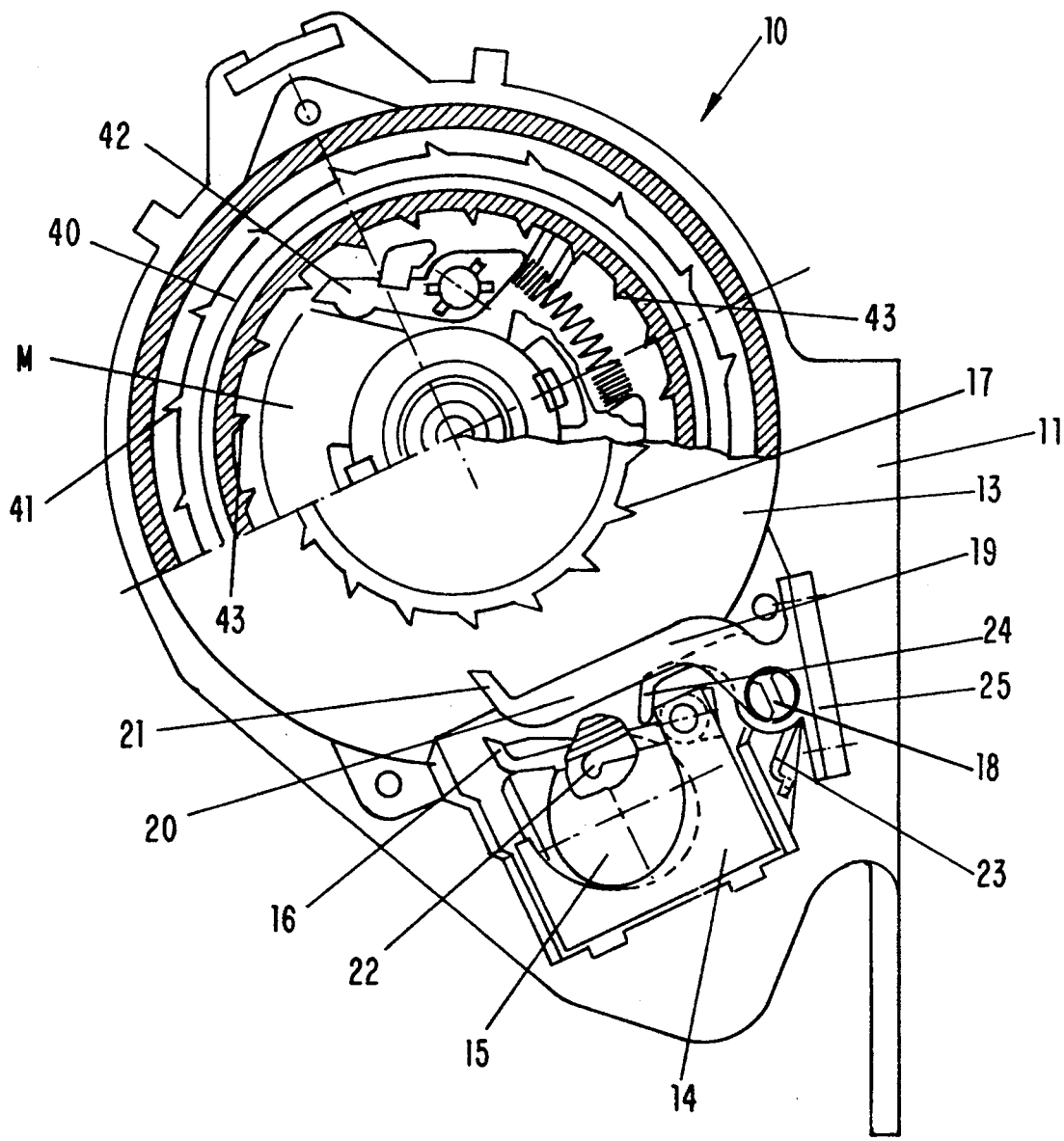
FIG. 1 a plan view of the so-called system side of a safety belt reeling device with the bearing cup partly cut away and the locking systems being deactivated, FIG. 2 the safety belt reeling device of FIG. 1 with the locking systems being activated, FIG. 3 a front-sectional view of the safety belt reeling device.

In each of the drawings only the means for activating and deactivating the safety belt-sensitive and the vehicle-sensitive locking system are illustrated, reference being made to the state of the art according to DE-OS 34 42 532 in respect of further details concerning the function of the safety belt reeling device. In principle the drawing is based on a self-locking safety belt reeling device 10 with so-called radial locking means. Although not shown in the drawing, a safety belt reeling shaft is mounted in a U-shaped casing of which only the U-leg 11 that is carrying the so-called system side of the safety belt reeling device 10 is illustrated. The safety belt reeling shaft penetrates the U-leg 11 with a shaft extension. A safety belt coil 12 is accommodated on the safety belt reeling shaft and has a thickness which is greatest when the safety belt is released and which diminishes by unwinding of the safety belt from the safety belt reeling shaft during the safety belt application procedure.

A locking member which is radially movable into engagement with a toothing fixed to the casing is eccentrically mounted on the shaft extension. The radial movement between a release and a locking position is controlled by a control disc 40. The control disc 40 in turn is controllable both by the so-called safety belt-sensitive as well as by the vehicle-sensitive locking system.

The safety belt-sensitive system which is intended to cause locking of the safety belt reeling device in the event of sudden pulling-out movements of the safety belt, is based on the control disc 40 on which a spring-loaded inertia mass M is centrally pivotally mounted. A control lever 42 supported on one side of the control disc 40 and adapted to be deflected outwardly by the inertia mass is provided in the trajectory of the possible pivotal movement of the inertia mass.

A bearing cup 13 is mounted in fixed relationship to the casing. The inner toothing 43 cooperating with the control lever 42 is freely rotatably mounted on the bearing cup 13 which is supported at the U-leg 11. The distance of the inner toothing 43 of the bearing cup 13 to the control lever 42 of the control disc 40 is selected such that the control lever 42 engages the inner toothing 43 of the bearing cup 13, when being deflected due to the movement of the inertia mass M of the control disc 40. The operation of a so designed safety belt-sensitive locking system is apparent more particularly from the state of the art cited for purposes of type definition.

The vehicle-sensitive system is formed by a spherical sensor 14 comprising a sphere 15 accommodated in a cup for translating the acceleration, respectively deceleration movements of the vehicle into a movement of the sensor lever 16 which in turn is adapted for engaging an outer toothing 41 of the control disc 40. Any deflection of the sphere 15 from its "normal position" causes the sensor lever 16 to engage the control disc 40 which revolves jointly with the safety belt reeling shaft whereby the control disc 40 is arrested and further rotational movement is prevented. The locking member, due to the prescribed function thereof, is deflected into the locking position of the safety belt reeling shaft.

With respect to activation and deactivation of the afore denoted locking systems, an outer toothing 17, integrally connected to the inner toothing 43 is provided on the bearing cup 13, the toothings 43, 17 being rotatably mounted within the bearing cup 13 on a pin-like extension of the safety belt reeling shaft.

A two-armed lever 19, one arm 20 of which, with its engaging tip 21, cooperates with the outer toothing 17 that is freely pivotable in the bearing cup 13, and the other arm 22 of which serves as a sensory arm for the safety belt coil 12, is mounted on the U-leg 11 of the casing and is pivotable about a pivoting axis 18. The lever 19 is springloaded towards its position of engagement (apparent from FIG. 2) by a torsion spring 23 arranged at its pivoting axis 18.

In addition, the lever 19 comprises a projection 24 which in the release position of the lever 19 (apparent from FIG. 1) presses against the sensor lever 16, preventing the latter from swinging out in the direction of the outer toothing 41 of the control disc 40, even in the event of movements of the sphere 15 in the cup.

At its rearmost end that is opposite the engaging tip and projects beyond the pivoting axis 18, the lever 19 is provided with a weight 25 which supports the action of the torsion spring 23 or takes its place in the event of failure, because due to the predetermined leverage, the engaging tip 21 of the lever 19 is held in engagement with the outer toothing 17 by the weight 25.

As is apparent from FIG. 1, the arm 22 of the lever, in the event of a fully wound up safety belt and maximum thickness of the safety belt coil 12 in the released position of the safety belt, is pivoted counter-clockwise against the action of the spring 23, so that in such a position the engaging tip 21 of the arm 20 of the lever 19 can in no event engage the outer toothing 17 in the bearing cup 13. The result is that the outer toothing 17 and thus also the inner toothing 43, coupled therewith and cooperating with the inertia locking system, is freely rotatable in the bearing cup 13, so that the control levers have no functional counter abutments in the interior of the bearing cup. Accordingly, both the safety belt-sensitive as well as the vehicle-sensitive locking systems are rendered inoperative according to the position apparent from FIG. 1 when the safety belt coil 12 has its maximum thickness.

Figure 2:
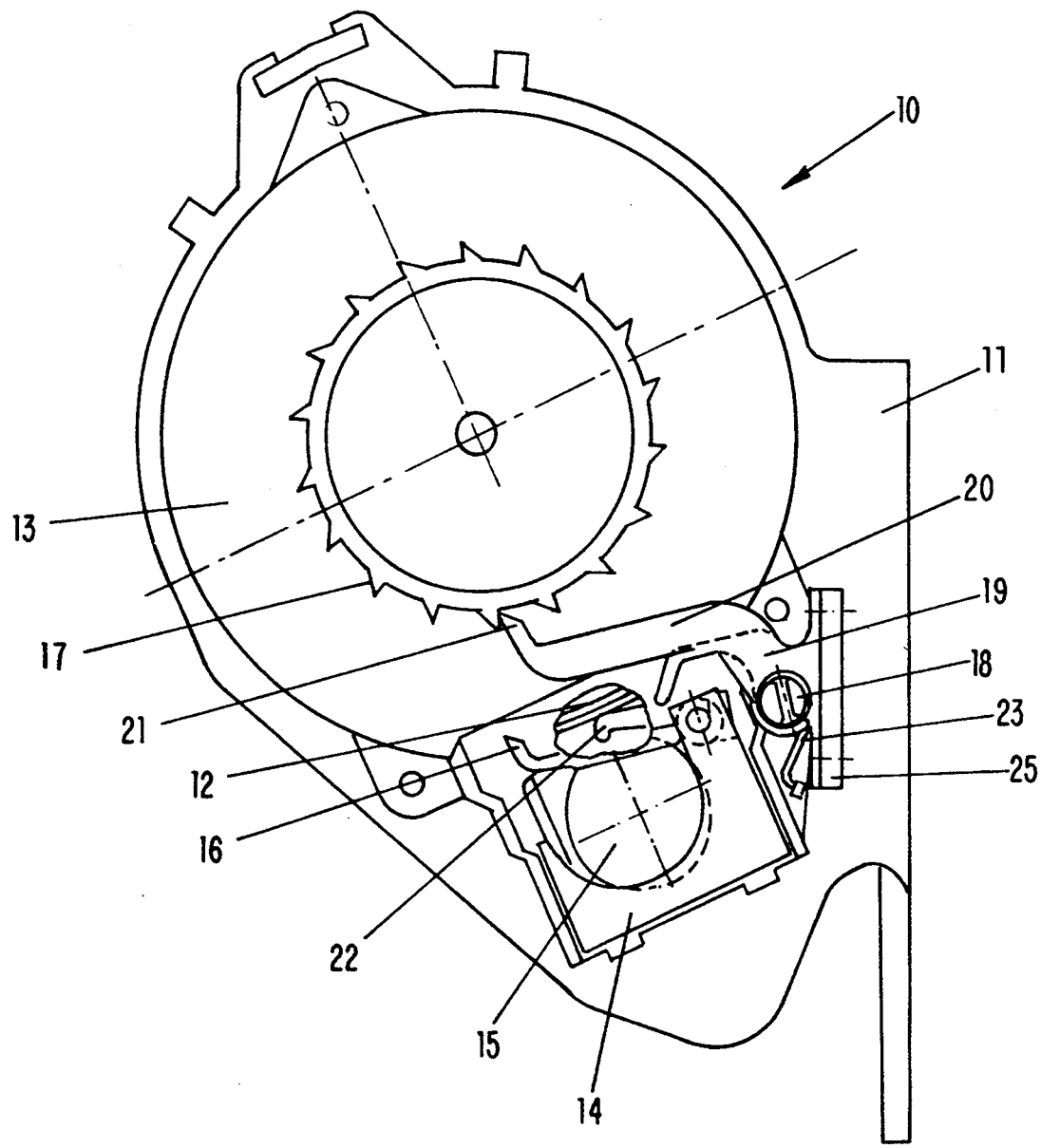
Figure 3:
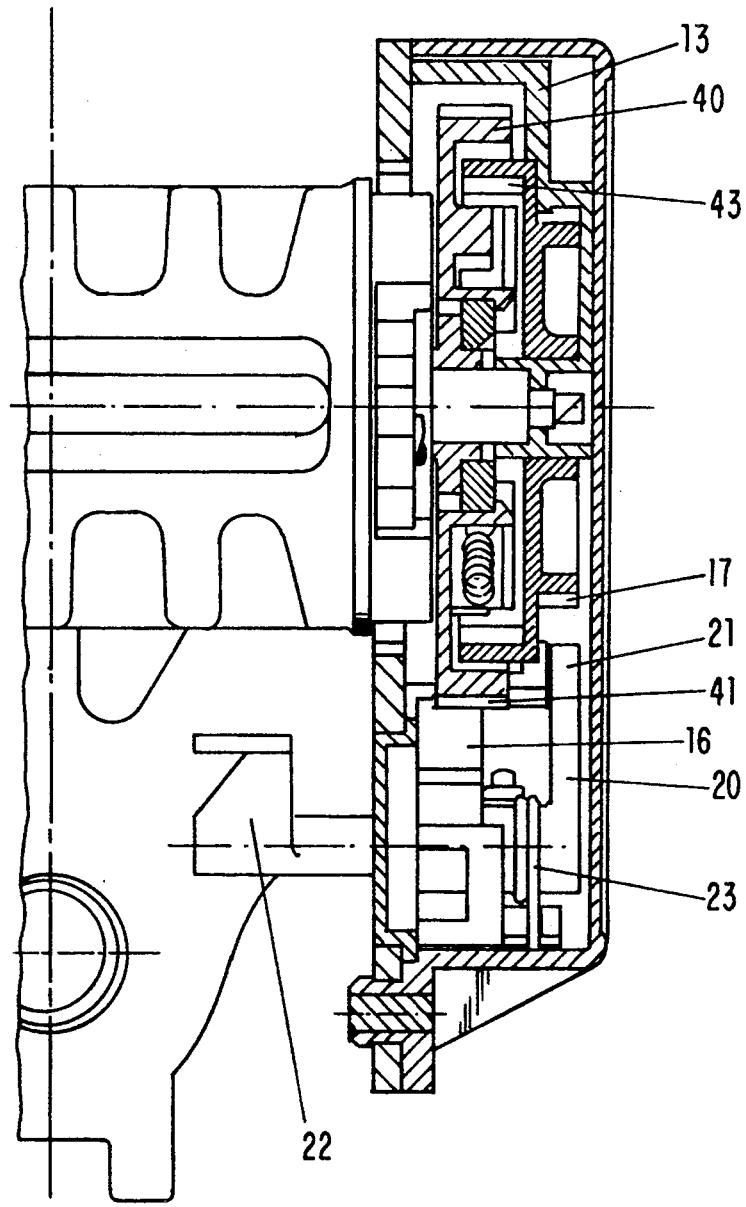

If, however, the thickness of the safety belt coil is reduced, as illustrated in FIG. 2, due to the fastening process, the unwinding movement is followed by the sensing arm 22 of the lever 19 in that the arm 19 is pivoted clockwise such that the engaging tip 21 of the lever 19 now engages the outer toothing 17, thereby arresting the toothing in the bearing cup 13 that is fixed to the casing, whereby the function of the belt-sensitive locking system of the safety belt reeling device is rendered operational.

The pivotal movement of the lever 19, as it follows the diminishing thickness of the safety belt coil 12, is brought about by the torsion spring 23 which biases the lever 19 into its position of engagement apparent from FIG. 2; even in the event of a malfunction or inoperativeness of this torsion spring, the provision of the weight 25 ensures that in any event the operation of the safety belt reeling device is ensured, even during failure of the torsion spring.

The features of the subject matter of these documents as disclosed in the foregoing description, the patent claims, the abstract and the drawings may be important individually as well as in any combination with one another for the realization of the invention in its various embodiments.

The present invention is, of course, in no way restricted to the specific disclosure of the specification and drawings, but also encompasses any modifications within the scope of the appended claims.

I claim:

1. A safety belt locking system comprising a casing, a belt reeling shaft supported in the casing for winding and unwinding the safety belt, a belt-sensitive locking device for the reel to prevent unwinding rotation and including a control disc mounted on the shaft, which control disc operates a locking element mounted on the shaft, a pivotable spring-loaded inertia mass mounted on the control disc for moving the locking element to engage with inner toothing mounted on the casing to prevent unwinding rotation of the reel above a predetermined belt unwinding speed; a vehicle-sensitive locking device for the reel to prevent unwinding rotation and including an inertia mass sensor mounted on the casing, and a sensor lever movable by the inertia mass sensor to engage toothing formed on the outside of the control disc to actuate the locking element to prevent reel unwinding rotation in an emergency situation of the vehicle; means to render the belt-sensitive and vehicle sensitive locking devices operable and inoperable comprising a bearing cup fixedly mounted to the casing, the inner toothing formed on a member rotatably mounted on the bearing cup, said member also having outer toothing formed thereon, a further lever mounted on the casing for pivoting movement to an engagement position, a spring for biassing the further lever to said position, said further lever including a first arm movable to engage the toothing on the member to prevent rotation thereof, a second arm mounted on the further lever for sensing the diameter of the belt on the reel, and a projection on the further lever for engaging the sensor lever to prevent movement thereof, wherein when the belt is wound to said predetermined diameter the first arm of the further lever is moved to a position out of engagement with the outer toothing of the member and the projection engages the sensor lever to keep the sensor lever out of engagement with the outer toothing of the control disc to render the vehicle-sensitive and belt-sensitive locking systems inoperable, and when the belt is unwound beyond said predetermined diameter the further lever is biassed toward its engagement position in which the first arm engages the second outer toothing of the member and the sensor lever is allowed to move to render the vehicle-sensitive and belt-sensitive locking systems operable.

2. A safety belt reeling device according to claim 1, wherein said first arm of said further lever has a first and a second end, said first end provided with an engaging tip and said second end opposite said engaging tip extending past a pivoting axis of said further lever and provided with a weight that biasses said further lever into said engagement position.

* * * * *